United States Patent
Porcelli et al.

(10) Patent No.: US 11,124,600 B2
(45) Date of Patent: Sep. 21, 2021

(54) POLYURETHANE FOAMS AND METHOD FOR MAKING THE FOAM

(71) Applicant: Dow Global Technologies LLC, Midland, MI (US)

(72) Inventors: Lucie Porcelli, Richterswil (CH); Paul A. Cookson, Samstagern (CH); Francois M. Casati, Pfaffikon (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/628,784

(22) PCT Filed: Jul. 8, 2018

(86) PCT No.: PCT/US2018/041171
§ 371 (c)(1),
(2) Date: Jan. 6, 2020

(87) PCT Pub. No.: WO2019/018142
PCT Pub. Date: Jan. 24, 2019

(65) Prior Publication Data
US 2020/0140603 A1 May 7, 2020

Related U.S. Application Data

(60) Provisional application No. 62/533,250, filed on Jul. 17, 2017.

(51) Int. Cl.
| C08G 18/48 | (2006.01) |
|---|---|
| C08G 18/76 | (2006.01) |
| C08G 18/18 | (2006.01) |
| C08G 18/20 | (2006.01) |
| C08G 18/32 | (2006.01) |
| C08G 18/66 | (2006.01) |
| C08J 9/12 | (2006.01) |
| C08J 9/38 | (2006.01) |

(52) U.S. Cl.
CPC ...... *C08G 18/7664* (2013.01); *C08G 18/1825* (2013.01); *C08G 18/2081* (2013.01); *C08G 18/3275* (2013.01); *C08G 18/4816* (2013.01); *C08G 18/4841* (2013.01); *C08G 18/6688* (2013.01); *C08J 9/125* (2013.01); *C08J 9/38* (2013.01); *C08G 2110/0008* (2021.01); *C08G 2110/0058* (2021.01); *C08G 2110/0083* (2021.01); *C08J 2201/022* (2013.01); *C08J 2201/026* (2013.01); *C08J 2205/05* (2013.01); *C08J 2205/06* (2013.01); *C08J 2375/08* (2013.01)

(58) Field of Classification Search
CPC ........... C08G 18/4816; C08G 18/4841; C08G 18/6688; C08G 18/7664; C08G 18/1825; C08G 18/2081; C08G 18/283; C08G 2110/0008; C08G 2110/0058; C08G 2110/0083; C08J 9/125; C08J 9/38; C08J 2205/05; C08J 2205/06
See application file for complete search history.

(56) References Cited

U.S. PATENT DOCUMENTS

| 6,068,790 A | 5/2000 | Postema |
|---|---|---|
| 2015/0307647 A1 | 10/2015 | Jacobs |

FOREIGN PATENT DOCUMENTS

| WO | 95/23819 A | 9/1995 | |
|---|---|---|---|
| WO | 96/0874 A | 3/1996 | |
| WO | 2010/009205 A | 1/2010 | |
| WO | WO-2011081793 A1 * | 7/2011 | ......... C08G 18/4812 |
| WO | 2015/050691 A | 4/2015 | |

* cited by examiner

*Primary Examiner* — Michael L Leonard

(57) ABSTRACT

Flexible polyurethane foams are made by reacting a polyether mixture and water with a polyisocyanate. The foams have excellent suite of properties for use in seating applications, as they are supporting, comfortable and resilient foam. A further advantage is these properties can be obtained at isocyanate indices of close to or even greater than 100.

13 Claims, No Drawings

POLYURETHANE FOAMS AND METHOD FOR MAKING THE FOAM

This invention relates to flexible polyurethane foam, polyol compositions useful for making flexible polyurethane foam and to methods for making flexible polyurethane foam using the polyol compositions.

Some bedding and furniture applications require foam cushioning that is highly resilient, supportive and comfortable.

Resiliency is usually evaluated using a ball rebound test such as ASDM D-3574-11. A value in excess of 50%, especially in excess of 52%, is generally wanted in these applications.

Support is indicated by compression force deflection (CFD), which is a measurement of how much force must be applied to compress the foam by a given amount. In these applications, a CFD value of 1.0 kPa or more, and especially 1.8 or more, at 40% compression is often needed, per the ISO3386-1 test.

Comfort can be expressed in terms of "sag factor", which is the ratio of the CFD value at 65% compression to that at 25% compression. Greater values are desired, as what is wanted is a foam that feels soft and yields under an applied weight, but nonetheless is capable of supporting the weight of an occupant. A sag factor of 3.5 or greater is highly desirable in these applications.

Certain polyurethane foams are available that meet all of these requirements. To achieve this combination of properties, the foams are generally made at a low isocyanate index, such as an index of 70 to 80. Higher isocyanate indices in these formulations tend to destabilize the foam formulation as it rises and cures. This leads to foam collapse, variability in foam density and quality, and other processing problems.

Nonetheless, there is a desire to operate at higher isocyanate indices. Low isocyanate index foam formulations tend to form significant amounts of aromatic amine reaction by-products. These contribute to odor and volatile organic compounds (VOC's) in the product.

It would be desirable to provide a process by which a supporting, comfortable, resilient foam is produced at an isocyanate index of 85 or greater.

The invention in one aspect is a mixture of polyethers that comprises a) 60 to 80% by weight, based on the weight of the mixture of polyethers, of one or more nominally trifunctional ethylene-oxide capped poly(propylene oxide) polyols having an oxyethylene content of 10 to 25% by weight and a hydroxyl equivalent weight of 1500 to 2500, in which at least 70% of the hydroxyl groups are primary;

b) 10 to 30% by weight, based on the weight of the mixture of polyethers, of one or more ethylene-oxide capped poly(propylene oxide) polyols having a nominal functionality of 4 to 8, an oxyethylene content of 10 to 25% by weight and a hydroxyl equivalent weight of 1500 to 2500, wherein at least 70% of the hydroxyl groups are primary hydroxyls;

c) 5 to 12% by weight, based on the weight of the mixture of polyethers, of one or more polyether polyols having a nominal functionality of at least 3, a molecular weight of at least 4000 and an oxyethylene content of at least 70% by weight; and d) 2 to 10% by weight, based on the weight of the mixture of polyethers, of one or more monofunctional copolymers of propylene oxide and ethylene oxide having an oxyethylene content of 20 to 65% by weight and a molecular weight of 400 to 2000.

The foregoing polyol mixture is an unusual combination of a high functionality polyether polyol (b) and a polyether monol (d) together with a high proportion of polyol c), which is believed to perform as a cell opener when the mixture is used to make a flexible polyurethane foam.

The invention is also a method for making a polyurethane foam. In the method, an aromatic polyisocyanate is reacted in the presence of at least one catalyst and at least one surfactant with at least one crosslinker, water and the foregoing mixture of polyethers, wherein the isocyanate index is 85 to 125 and the amount of water is 1.0 to 3.0 parts by weight per 100 parts by weight of the mixture of polyethers.

The invention is also a flexible polyurethane foam made by the foregoing method. The foam is characterized in being resilient, as indicated by a resiliency of at least 50% and preferably at least 52% on the ASTM D-3574-11 ball rebound test: in having a compression force deflection (CFD) at 40% compression of at least 1.0 kPa as measured according to ISO3386-1, in having a "sag factor" of 3.5 or greater and in having a density of 55 to 120 kg/m$^3$. These results are obtained at an isocyanate index that is close to 100 or more, which provides the additional benefit of reducing the amount of aromatic amine by-products in the foam product.

Polyol a) may be a single polyol or a mixture of polyols. Each polyol within Polyol a) is preferably an oxyethylene-capped poly(propylene oxide) formed by polymerizing propylene oxide or a mixture of propylene oxide and ethylene oxide onto a triol initiator, followed by polymerizing ethylene oxide by itself onto the end of the polyether chain. The initiator may be, for example, glycerin, trimethylolpropane or triethylolpropane. The polymerization of the propylene oxide or propylene oxide/ethylene oxide mixture may be performed in a single step or in two or more steps. Each Polyol a) polyol may have an oxyethylene content of 10 to 20% or 12 to 17% by weight, based on the entire weight of such polyol.

Each polyol included within Polyol a) may have a hydroxyl equivalent weight of 1750 to 2200. Hydroxyl equivalent weight is determined by obtaining a hydroxyl number (in mg KOH/g polyol) using titration methods such as set forth in ASTM D4274, and converting the hydroxyl number to equivalent weight using the relationship:

Equivalent Weight=56,100÷OH number.

At least 75%, at least 80% or at least 85% of the hydroxyl groups of each polyol within Polyol a) may be primary.

Polyol b) may be a single polyol or a mixture of polyols. Each polyol within Polyol b) is preferably an oxyethylene-capped poly(propylene oxide) formed by polymerizing propylene oxide or a mixture of propylene oxide and ethylene oxide onto an initiator having 4 to 8 alkoxylatable sites, followed by polymerizing ethylene oxide by itself onto the end of the polyether chains. Examples of such initiators are polyols having 4 to 8 hydroxyl groups such as pentaerythritol, erythritol, sucrose, sorbitol and the like as well polyamines such as ethylene diamine. The polymerization of the propylene oxide or propylene oxide/ethylene oxide mixture may be performed in a single step or in two or more steps. Each Polyol b) polyol may have an oxyethylene content of 10 to 20% or 12 to 17% by weight, based on the entire weight of such polyol. Each polyol included within Polyol b) may have a hydroxyl equivalent weight of 1500 to 2200 or 1650 to 2200. At least 80% or at least 85% of the hydroxyl groups of such polyol(s) may be primary.

It is convenient from a manufacturing standpoint to produce Polyol b) and at least a part of Polyol a) as a mixture, by alkoxylating a mixture of a trifunctional initiator and an initiator having 4 to 8 alkoxylatable groups. Such a coinitiated polyol contains a proportion of trifunctional polyether molecules (which form all or part of Polyol a)) and others having a nominal functionality of 4 to 8 (which form all or part of Polyol b)). An example of such a product is a polyether polyol initiated with a sorbitol/glycerin mixture or a sucrose/glycerin mixture. Such a mixture may have an average functionality of 4 to 5, especially 4.2 to 4.8, hydroxyl groups per molecule.

Polyol c) also may be a single polyol or a mixture of polyols. Each polyol within Polyol c) is preferably i) an ethylene oxide homopolymer, ii) a random copolymer of at least 70% by weight ethylene oxide and up to 30% propylene oxide, or iii) a block copolymer of at least 70% by weight ethylene oxide and up to 30% by weight propylene oxide. Each polyol within Polyol c) has a nominal functionality of at least 3. The functionality may be, for example, up to 8, up to 6 or up to 4. The number average molecular weight of each polyol within Polyol c) may be at least 4800 g/mol, and may be up to, for example, 12,000, up to 10,000, or up to 8000 g/mol, as measured by gel permeation chromatography.

Polyol d) may be a single polyol or a mixture of polyols. Each polyol within Polyol d) is preferably i) a random copolymer made by copolymerizing a mixture of 80 to 35% by weight propylene oxide and correspondingly 20 to 65% by weight ethylene oxide onto a monofunctional initiator or ii) a block copolymer made by sequential addition of propylene oxide and ethylene oxide (in either order) onto such an initiator. Examples of such initiators are monols such as a C1-C16 alkanol. The polymerization may be performed in a single step or in two or more steps. Each Polyol d) polyol may have an oxyethylene content of 20 to 65% by weight, 45 to 63% by weight or 50 to 60% by weight, based on the entire weight of such polyol. Each polyol included within Polyol d) may have a number average molecular weight of 400 to 1500, 450 to 1000 or 450 to 850. At least 75%, at least 80% or at least 85% of the hydroxyl groups of such polyol(s) may be primary.

The polyol mixture of the invention may contain 60 to 80%, 65 to 80% or 65 to 75% by weight of polyol a); 10 to 30% or 10 to 20% by weight of polyol b); 5 to 12% or 5 to 10% of polyol c) and 2 to 10%, 2 to 8% or 3 to 6% of polyol d), all based on the combined weights of polyols a)-d).

The polyol mixture of the invention is useful for making resilient flexible polyurethane foam.

Polyurethane foam is made in accordance with the invention by reacting the polyol mixture, water, and a crosslinker with an aromatic polyisocyanate in the presence of at least one catalyst and at least one surfactant.

The crosslinker is, for purposes of this invention, a compound having at least three hydroxyl groups, or at least two hydroxyl groups plus at least one primary or secondary amino group, and a molecular weight of up to 300, preferably up to 200. Examples of crosslinkers include triethanolamine, diethanolamine, triisopropanolamine, diisopropanolamine, glycerin, trimethylolpropane, trimethylolethane, pentaerythritol, erythritol, and alkoxylates of any of the foregoing having molecular weights of up to 300.

A useful amount of the crosslinker is 0.5 to 5 parts by weight, 1 to 4 parts by weight, or 1.5 to 3.5 parts by weight, per 100 parts by weight of the polyol mixture.

The amount of water may be 1.0 to 3.0 parts, 1.0 to 2.8 parts, 1.25 to 2.5 parts, 1.5 to 2.25 parts or 1.5 to 2.0 parts per 100 parts by weight of the polyol mixture. These amounts of water include all water provided to the reaction, including water that may be present in the polyol mixture and/or the crosslinker, separately added water, and water from any other sources.

The polyol mixture, water and crosslinker are formed into a reaction mixture with an aromatic polyisocyanate. Isocyanate-reactive compounds in addition to the polyol mixture, crosslinker and water may be present, but if they are present at all, they preferably are present in an amount no greater than 10 parts by weight, no more than 5 parts by weight, preferably no more than 2 parts by weight, per 100 parts by weight of the polyol mixture.

The polyols that constitute the polyol mixture may be blended together prior to forming the reaction mixture. Alternatively, the polyols may be brought together individually or in various subcombinations to form the reaction mixture. The crosslinker and water can be added as separate streams, premixed, and/or combined with one or more of the components of the polyol mixture (or the polyol mixture itself) prior to being formed into a reaction mixture with the polyisocyanate.

The aromatic polyisocyanate has an isocyanate equivalent weight of 75 to 300, preferably 85 to 175. Examples of useful aromatic polyisocyanate include, for example, m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or a mixture of any two or more thereof. Diphenylmethane-4,4'-diisocyanate, diphenylmethane-2,4'-diisocyanate and mixtures thereof are generically referred to as MDI, and all can be used. "Polymeric MDI", which is a mixture of PMDI and MDI, can be used. Toluene-2,4-diisocyanate, toluene-2,6-diisocyanate and mixtures thereof are generically referred to as TDI, and all can be used. Any of the forgoing may be modified with, for example, one or more urea, urethane, carbodiimide, allophonate, isocyanurate or biuret linkages.

A preferred aromatic polyisocyanate is MDI (the 2,4'- or 4,4'-isomer or a mixture of those isomers) or an MDI modified with one or more urea, urethane, carbodiimide, allophonate, isocyanurate or biuret linkages to produce an isocyanate mixture that is a room temperature liquid and has an isocyanate equivalent weight of 135 to 200.

The isocyanate index is at least 85, at least 90, at least 95 or at least 100 and may be as high as 125, as high as 115 or as high as 110. Isocyanate index is 100 times the ratio of isocyanate groups provided to the reaction mixture to the total number of isocyanate-reactive groups provided to the reaction mixture. For purposes of calculating isocyanate index, water is considered to have two isocyanate-reactive groups per molecule and a primary amino group is considered as a single isocyanate-reactive group.

The reaction is performed in the presence of one or more catalysts. The catalyst(s) catalyze either or both of the water-isocyanate reaction and the alcohol-isocyanate reaction. Suitable catalysts include, for example, tertiary amines, cyclic amidines, tertiary phosphines, various metal chelates, acid metal salts, strong bases, various metal alcoholates and phenolates and metal salts of organic acids. Examples of metal-containing catalysts are tin, bismuth, cobalt and zinc salts. Catalysts of most importance are tertiary amine catalysts, cyclic amidines, zinc catalysts and tin catalysts. Examples of tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains 4 to 18 carbon atoms. Mixtures of these tertiary amine catalysts are often used.

A reactive amine catalyst such as DMEA (dimethylethanolamine) or DMAPA (dimethylaminopropyl amine), or an amine-initiated polyol acting as an autocatalytic polyol, may also be used to reduce VOC's (volatile organic compounds).

Tin catalysts include stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 18, and the like. Zinc and tin catalysts are generally used in conjunction with one or more tertiary amine catalysts, if used at all.

Catalysts are typically used in small amounts, for example, each catalyst being employed from about 0.0015 to about 5 or 0.1 to 0.5 parts by weight per 100 parts by weight of the polyol mixture.

The reaction is also performed in the presence of a foam-stabilizing surfactant. The foam-stabilizing surfactant helps stabilize gas bubbles formed by the blowing agent during the foaming process until the polymer has cured. A wide variety of silicone surfactants as are commonly used in making polyurethane foams can be used in making the foams. Examples of such silicone surfactants are commercially available under the trade names Tegostab™ (Th. Goldschmidt and Co.), Niax™ (GE OSi Silicones) and Dabco™ (Air Products and Chemicals). The surfactant(s) may be present in an amount of 0.25 to 5 or 0.5 to 2.5 parts by weight per 100 parts by weight of the polyol mixture.

The foam formulation may contain one or more ingredients in addition to those mentioned above. These include, for example, fillers such as melamine and calcium carbonate; polymer dispersions such as a polyolefin dispersion; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; plasticizers; paraffin oil; plant or animal oils or fats; epoxidized vegetable oils and/or animal fats; wax particles; gel particles and the like.

It may be desirable to include an auxiliary blowing agent in the foam formulation. Such auxiliary blowing agents include physical (endothermic) blowing agents such as various low-boiling chlorofluorocarbons, fluorocarbons, hydrocarbons and the like; as well as chemical (exothermic) blowing agents (other than water) that decompose or react under the conditions of the polyurethane-forming reaction. In addition, a gas such as carbon dioxide, air, nitrogen or argon may be used as an auxiliary blowing agent in a frothing process. Carbon dioxide can also be used as a liquid or as a supercritical fluid.

Foam is made by combining the foregoing ingredients and subjecting the resulting reaction mixture to conditions at which curing takes place to produce the foam. The polyisocyanate preferably is mixed with the other ingredients using a mixhead or other apparatus that creates an intimate mixture of the various components of the reaction mixture.

The curing step requires no special processing conditions; therefore, processing conditions and equipment described in the art for making flexible polyurethane foam are entirely suitable. In most cases when a catalyst is present, the isocyanate compounds will react spontaneously with water and the polyols even at room temperature (22° C.). If necessary, heat can be applied to the reaction mixture to speed the curing reaction. This can be done by heating some or all of the ingredients prior to combining them, by applying heat to the reaction mixture, or some combination of each. Curing is continued until the reaction mixture has expanded and cured sufficiently to form a stable foam.

In some embodiments, the curing step is performed in a closed mold. In such a process, the reaction mixture is either formed in the mold itself, or formed outside the mold and then injected into the mold, where it cures. The expansion of the reaction mixture as it cures is therefore constrained by the internal surfaces of the mold, as are the size and geometry of the molded part.

In other embodiments, the curing step is performed in a free-rise (or slabstock) process. In the free-rise process, the reaction mixture is poured into an open container such that expansion in at least one direction (usually the vertical direction) occurs against the atmosphere or a lightweight surface (such as a film) that provides negligible resistance to the expansion of the foam. In the free-rise process, the reaction mixture expands in at least one direction essentially unconstrained except by its own weight. The free-rise process may be performed by forming the reaction mixture and dispensing it into a trough or onto a conveyor where it expands and cures.

The polyurethane foam produced in accordance with the invention has a foam density of at least 55 kg/m³. The foam density may be at least 58 kg/m³, and may be up to 120 kg/m³, up to 100 kg/m³, up to 80 kg/m³ or up to 75 kg/m³ as measured by ISO845-88. The foam has a resiliency of at least 50%, preferably at least 52% or at least 54% as measured by the ASTM D-3574-11 ball rebound test. The resiliency may be up to 75% or up to 65%.

The polyurethane foam has a compression force deflection (CFD) at 40% compression of at least 1.0, preferably at least 1.2 and more preferably at least 1.8 kPa as measured according to ISO3386-1. The 40% CFD may be at least 2.2 kPa or at least 2.5 kPa, and may be up to, for example, 4 kPa or 3.6 kPa. The "sag factor" is at least 3.5 and may be at least 3.6, at least 3.7 or at least 3.8. The sag factor may be as high as 6 or as high as 5.6.

The foam of the invention preferably has an air flow, after crushing to mechanically open cells, of at least 1.25 liters per second, preferably 1.25 to 5 liters per second or 1.25 to 2 liters per second, as measured according to ISO7231.

Due to the foregoing combination of density, resiliency, hardness (as indicated by the 40% CFD value) and sag factor, foam made in accordance with the invention is very well suited for furniture and bedding applications.

The foam of the invention is useful in cushioning applications such as pillows, mattresses, backrests (for bed headboards, seating, etc.), seating cushions, packaging, protective cushioning, and the like. They can be used as or as a component of sound and/or vibration (i.e., NVH) damping measures.

The following examples are provided to illustrate the invention, but are not intended to limit the scope thereof. All parts and percentages are by weight unless otherwise indicated.

EXAMPLES 1-4 AND COMPARATIVE SAMPLE A

Polyurethane foams are made from the formulations described in the Table below. The amount of water indicated is total water from all sources.

Polyol 1 is a 2000 equivalent weight ethylene oxide-capped poly(propylene oxide) triol. It has greater than 70% primary hydroxyl groups and an oxyethylene content of about 15% based on the weight of Polyol 1.

Polyol 2 is a mixture of an ethylene oxide-capped poly(propylene oxide) triol and a 1750 equivalent weight ethylene oxide-capped poly(propylene oxide) hexol. It is prepared by propoxylating and then ethoxylating a mixture of glycerin and sorbitol. The triol and hexol each have greater than 70% primary hydroxyl groups and an oxyethylene content of about 15% based on the weight of Polyol 1.

Polyol 3 is a copolymer of ethylene oxide and propylene oxide. It has an oxyethylene content of at least 70%, a nominal hydroxyl functionality of 3 and molecular weight of about 5000.

Polyol 4A is a 750 molecular weight monofunctional block copolymer of about 50% propylene oxide and 50% ethylene oxide.

Polyol 4B is a 500 molecular weight monofunctional block copolymer of about 60% propylene oxide and 40% ethylene oxide.

The polyisocyanate is a polymeric MDI having an isocyanate equivalent weight of about 130.

All ingredients except the isocyanate are stirred together at room temperature using a propeller mixer. The isocyanate is then added. The ingredients are stirred for 10 additional seconds and the resulting mixture poured into a 30×30×25 cm open box, where it cures without added heat. The resulting foam is removed from the box and post-cured at 140° C. for 5 minutes. The foam is cooled to room temperature and manually crushed. The tightness of the foam is evaluated subjectively as the foam is crushed, and rated on a scale of 1-10 with 1 representing a very open foam and 10 representing a very tight foam with many closed cells.

Foam density (ISO845-88), CFD (ISO3386-1) at 25%, 40% and 65% compression, resiliency (ASTM D3574-11), air flow (ISO7231) (on the crushed foam), hysteresis (ISO3386-1) and compression set (ISO1856) at 75% compression and 90% compression are all measured. Sag factor is calculated from the 65% and 25% compression measurements. Results are as indicated in the Table.

TABLE

| | Example or Comparative Sample | | | | |
|---|---|---|---|---|---|
| | A* | 1 | 2 | 3 | 4 |
| Ingredient | | | | | |
| Polyol 1 | 67.5 | 65.0 | 65.0 | 65.0 | 62.5 |
| Polyol 2 | 25.0 | 22.5 | 22.5 | 22.5 | 22.5 |
| Polyol 3 | 5.0 | 7.5 | 7.5 | 7.5 | 10.0 |
| Polyol 4A | 0 | 5.0 | 5.0 | 0 | 5.0 |
| Polyol 4B | 0 | 0 | 0 | 3.35 | 0 |
| Polyol a/b/c/d Ratio | 75.8/16.7/5/0 | 72.5/15/7.5/5 | 72.5/15/7.5/5 | 73.7/15.3/7.6/3.4 | 70/15/10/5 |
| Blocked Amine Catalyst | 0.14 | 0.14 | 0.14 | 0.14 | 0.14 |
| 33% triethylene diamine solution | 0.23 | 0.23 | 0.23 | 0.23 | 0.23 |
| 85% diethanolamine in water | 2.41 | 2.41 | 2.41 | 2.41 | 2.41 |
| Silicone Surfactant | 1.35 | 1.35 | 1.35 | 1.35 | 1.35 |
| Water | 1.88 | 1.88 | 1.88 | 1.88 | 1.88 |
| Isocyanate Index | 90 | 90 | 110 | 90 | 90 |
| Properties | | | | | |
| Foam Tightness Rating | 5 | 4 | 1 | 3 | 2 |
| Density, kg/m³ | 62 | 62 | 59 | 62 | 67 |
| 25% CFD, kPa | 2.6 | 1.8 | 2.1 | 1.8 | 1.2 |
| 40% CFD, kPa | 3.5 | 2.6 | 3.2 | 2.6 | 2.0 |
| 65% CFD, kPa | 8.6 | 6.9 | 9.4 | 7.1 | 6.7 |
| Sag factor | 3.3 | 3.8 | 4.5 | 4.0 | 5.5 |
| Hysteresis, % | 82 | 80 | 77 | 80 | 78 |
| Resilience, % | 61 | 54 | 57 | 57 | 50 |
| Air flow, L/s | 1.1 | 1.5 | 1.5 | 1.3 | 1.5 |
| 75% Compression Set, % | 3 | 4 | 5 | 3 | 4 |
| 90% Compression Set, % | 4 | 4 | 6 | 4 | 7 |

As indicated by the data in Table, the polyether mixture of the invention provides a foam having, at equivalent densities, higher airflow and higher sag factors. 25% CFD values are lower, which is desirable for furniture and bedding applications. The foams of the invention also process more easily, as indicated by the lower tightness ratings. Example 2 is especially notable, as these excellent results are obtained at an isocyanate index greater than 100.

What is claimed is:

1. A mixture of polyethers that comprises
   a) 60 to 80% by weight, based on the weight of the mixture of polyethers, of one or more nominally tri-functional ethylene-oxide capped poly(propylene oxide) polyols having an oxyethylene content of 10 to 25% by weight and a hydroxyl equivalent weight of 1500 to 2500, in which at least 70% of the hydroxyl groups are primary;
   b) 10 to 30% by weight, based on the weight of the mixture of polyethers, of one or more ethylene-oxide capped poly(propylene oxide) polyols having a nominal functionality of 4 to 8, an oxyethylene content of 10 to 25% by weight and a hydroxyl equivalent weight of 1500 to 2500, wherein at least 70% of the hydroxyl groups are primary hydroxyls;
   c) 5 to 12% by weight, based on the weight of the mixture of polyethers of one or more polyether polyols having a nominal functionality of at least 3, a molecular weight of at least 4000 and an oxyethylene content of at least 70% by weight; and
   d) 2 to 10% by weight, based on the weight of the mixture of polyethers, of one or more monofunctional copolymers of propylene oxide and ethylene oxide having an oxyethylene content of 20 to 65% by weight and a molecular weight of 400 to 2000.

2. The mixture of polyethers of claim 1 which comprises 65 to 75% by weight of a), 10 to 20% of b), 5 to 10% of c) and 3 to 6% of d).

3. The mixture of polyethers of claim 2 wherein d) has an oxyethylene content of 40 to 63% by weight.

4. A method for making a polyurethane foam, comprising reacting an aromatic polyisocyanate with at least one cross-linker, water a mixture of polyethers and no more than 2 parts by weight, per 100 parts by weight of the polyol mixture of other isocyanate-reactive compounds in the presence of at least one catalyst and at least one surfactant, wherein the isocyanate index is 85 to 125 and the amount of water is 1.0 to 3.0 parts by weight per 100 parts by weight of the mixture of polyethers to produce a polyurethane foam having a foam density of at least 55 kg/m$^3$, wherein the mixture of polyethers comprises a) 60 to 80% by weight, based on the weight of the mixture of polyethers, of one or more nominally trifunctional ethylene-oxide capped poly(propylene oxide) polyols having an oxyethylene content of 10 to 25% by weight and a hydroxyl equivalent weight of 1500 to 2500, in which at least 70% of the hydroxyl groups are primary;

b) 10 to 30% by weight, based on the weight of the mixture of polyethers, of one or more ethylene-oxide capped poly(propylene oxide) polyols having a nominal functionality of 4 to 8, an oxyethylene content of 10 to 25% by weight and a hydroxyl equivalent weight of 1500 to 2500, wherein at least 70% of the hydroxyl groups are primary hydroxyls;

c) 5 to 12% by weight, based on the weight of the mixture of polyethers of one or more polyether polyols having a nominal functionality of at least 3, a molecular weight of at least 4000 and an oxyethylene content of at least 70% by weight; and d) 2 to 10% by weight, based on the weight of the mixture of polyethers, of one or more monofunctional copolymers of propylene oxide and ethylene oxide having an oxyethylene content of 20 to 65% by weight and a molecular weight of 400 to 2000.

5. The method of claim 4 wherein the amount of water is 1.5 to 2.25 parts by weight per 100 parts by weight of the mixture of polyethers.

6. The method of claim 4 wherein the isocyanate index is at least 90.

7. The method of claim 4 wherein the isocyanate index is at least 100.

8. A flexible polyurethane foam made by the method of claim 4.

9. The flexible polyurethane foam of claim 8, which has a resiliency of at least 50% on the ASTM D-3574-11 ball rebound test, a compression force deflection (CFD) at 40% compression of at least 1.0 kPa as measured according to ISO3386-1, and a sag factor of 3.5 or greater.

10. The flexible polyurethane foam of claim 8, which has a resiliency of at least 52% on the ASTM D-3574-11 ball rebound test, a compression force deflection (CFD) at 40% compression of at least 1.8 kPa as measured according to ISO3386-1, a sag factor of 3.6 or greater and an airflow after mechanical crushing of at least 1.25 liters per second.

11. The flexible polyurethane foam of claim 8, which has a sag factor of 3.8 or greater.

12. The mixture of polyethers of claim 1 wherein b) is formed by polymerizing propylene oxide or a mixture of propylene oxide and ethylene oxide onto sorbitol or sucrose to form polyether chains, followed by polymerizing ethylene oxide by itself onto the end of the polyether chains.

13. The method of claim 4 wherein b) is formed by polymerizing propylene oxide or a mixture of propylene oxide and ethylene oxide onto sorbitol or sucrose to form polyether chains, followed by polymerizing ethylene oxide by itself onto the end of the polyether chains.

\* \* \* \* \*